Oct. 31, 1933.    H. W. FLETCHER ET AL    1,932,964
BALANCED PLUG VALVE
Filed May 16, 1931

Harold W. Fletcher
Floyd L. Scott
INVENTORS

BY Jesse R. Stone
ATTORNEY

Patented Oct. 31, 1933

1,932,964

UNITED STATES PATENT OFFICE 1,932,964

BALANCED PLUG VALVE

Harold W. Fletcher and Floyd L. Scott, Houston, Tex., assignors to Hughes Tool Company, Houston, Tex., a corporation of Texas Application May 16, 1931. Serial No. 537,791

3 Claims. (Cl. 251—97)

Our invention relates to plug valves or stop cocks in which the valve member is rotatable in the valve housing.

It is an object of the invention to provide a plug valve in which the necessity for packing is avoided.

We also desire to exert a balanced fluid pressure longitudinally of the valve plug so that it may be more easily operated and controlled.

The invention includes means to lubricate the bearing surfaces to assist in preserving a seal about the valve when it is closed.

In the drawing herewith Fig. 1 is a section longitudinally of the valve body taken upon the plane 1—1 of Fig. 2.

Figure 1:
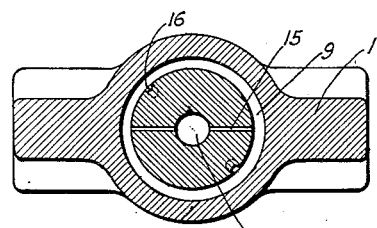

The body or housing of the valve has a fluid channel 2 longitudinally thereof, the wall of said channel being threaded at each end for coupling the valve within a fluid conducting line.

Centrally of the body is a transverse downwardly tapered opening to receive the valve plug 3. Said plug is threaded at 4 at its smaller end, said threaded portion being cylindrical and the thread is a fine pitched thread engaging in the threaded downward extension 6 of the valve housing. The upper, or larger end of the plug is also cylindrical and threaded with a fine thread 5 of the same pitch as is the thread 4. The upper end of the plug projects from the housing and is squared at 7 to receive a wrench by means of which it may be rotated.

The portion 8 of the plug, intermediate the ends of the valve, is tapered and fits a tapered seat 8ª in the valve body about the passage 2 through said body. On each side of the passage 2, the valve body is provided with an inner annular groove, one at 9 at the larger side, and one at 10 on the smaller side. The valve plug is formed with recesses adjacent each of the grooves, the recess 11 on the larger end being similar to the recess 12 at the lower side so that fluid pressure thereon will be approximately balanced.

Lubricant is contained in an axial recess 13 in the plug, the outer end of which is closed by a threaded plug 14. The lower end of the recess has radially extending ducts 15 leading to the groove 9. The outer surface of the plug valve has longitudinal grooves 16, see Fig. 1, which conduct lubricant from the upper groove 9 to the lower groove 10, said grooves 16 being closed on the outer side by the valve body in either open or closed position so that a passage is thus provided.

Figure 3:
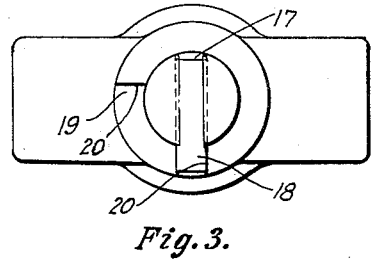
Fig. 3 is a bottom plan view of the same.

To prevent rotation of the plug within the body beyond its necessary 90° of movement, the lower end of the plug has a diametrical mortised groove 17. The lower end of the plug is normally flush with the lower end of branch 6 of the body, and the wall of said extension 6 is cut away around a 90 degree sector thereof, as seen at 19 in Fig. 3. A pin or key 18 is inserted through said cut away portion 19 and the groove 17 in the plug, the head of said key projecting into the cut away portion so that said head will contact with the shoulders 20 at each end of said portion, thus limiting the rotative movement of the plug.

Figure 2:
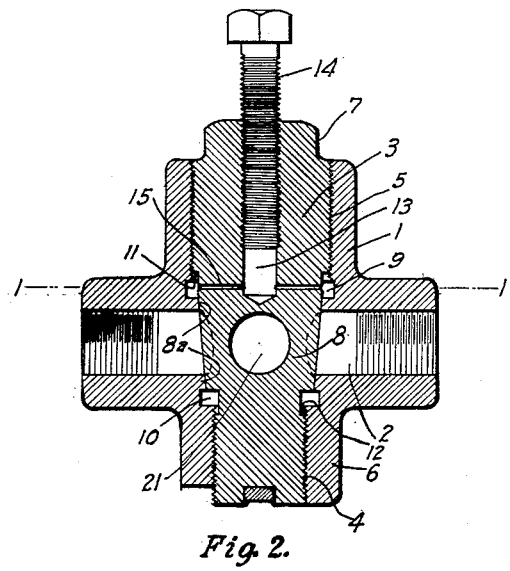
Fig. 2 is a central vertical section through the valve.

As the threads 4 and 5 are of the same pitch, the plug may be rotated to open or close the valve. When the plug is in closed position as seen in Fig. 2, with the transverse passage 21 therein at right angles to the passages 2 in the body the plug will be screwed down firmly into its seat 9. Lubricant, preferably a heavy grease, is forced through the grooves 9, 16 and 10, thus forming a seal about the plug and assisting materially in preventing leakage. This supply of grease to the grooves may be increased at any time by screwing down the plug 14. This lubricant offers resistance to the leakage of fluid under pressure in the line, out around the ends of the plug. Also the threads form a labyrinth through which escape of lubricant or pressure fluid will be practically prevented.

When the plug is rotated to place the valve in open position, the plug will be unscrewed a quarter of a turn. This will lift the plug slightly from its seat 8ª but as the thread is of fine pitch this raising movement will be slight and will not permit leakage about the plug. It is also to be noted that the packing means, that is, the threaded areas 4 and 5 with lubricant therein, are not changed in either open or closed position.

Figure 4:
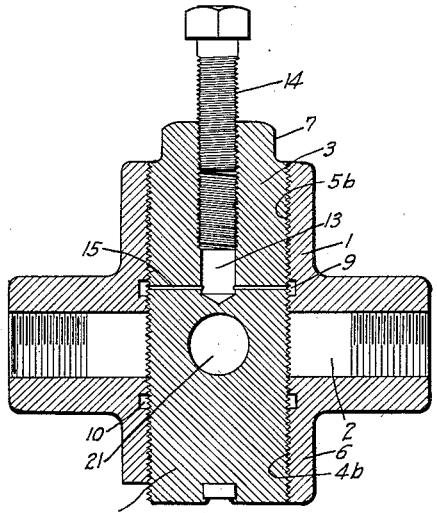
Fig. 4 is a vertical section through a modified form of the invention.

In Fig. 4 we show a slight modification in which the plug valve 3ᵇ is cylindrical and is threaded from end to end. The valve body is formed to fit said plug, having cylindrical threaded seats 4ᵇ and 5ᵇ to receive the same. The action of this form is not materially different from that previously described. Reliance is placed entirely upon the threaded engagement of the plug with the valve body for preventing leakage. We find, however, that the threads constantly supplied with grease, form a labyrinth which effectively prevents leakage even under high pressures.

What we claim as new is:

1. A valve including a body having a fluid passage therethrough, a plug transversely of said passage, said plug having threaded engagement at each end with said body, an intermediate unthreaded portion to said valve, and means to furnish lubricant to the threaded portions of said plug, said plug having a fluid opening therein.

2. A valve including a body having a fluid passage therethrough, a plug transversely of said passage, said plug having threaded engagement at each end with said body, the portion of said plug between said ends being smooth and tapered, a lubricant containing recess in said plug, passages for lubricant from said recess to the threaded area of said plug, and means to force lubricant through said passages.

3. A valve including a body having a longitudinal fluid passage, a plug transversely of said passage and having a fluid opening therethrough, said plug being cylindrical at both ends, one end being smaller than the other, said end being threaded to engage said body and prevent leakage from said passage.

HAROLD W. FLETCHER.
FLOYD L. SCOTT.